Nov. 28, 1944.   F. A. KING   2,363,533
REELING MECHANISM
Filed Sept. 20, 1941   2 Sheets-Sheet 1
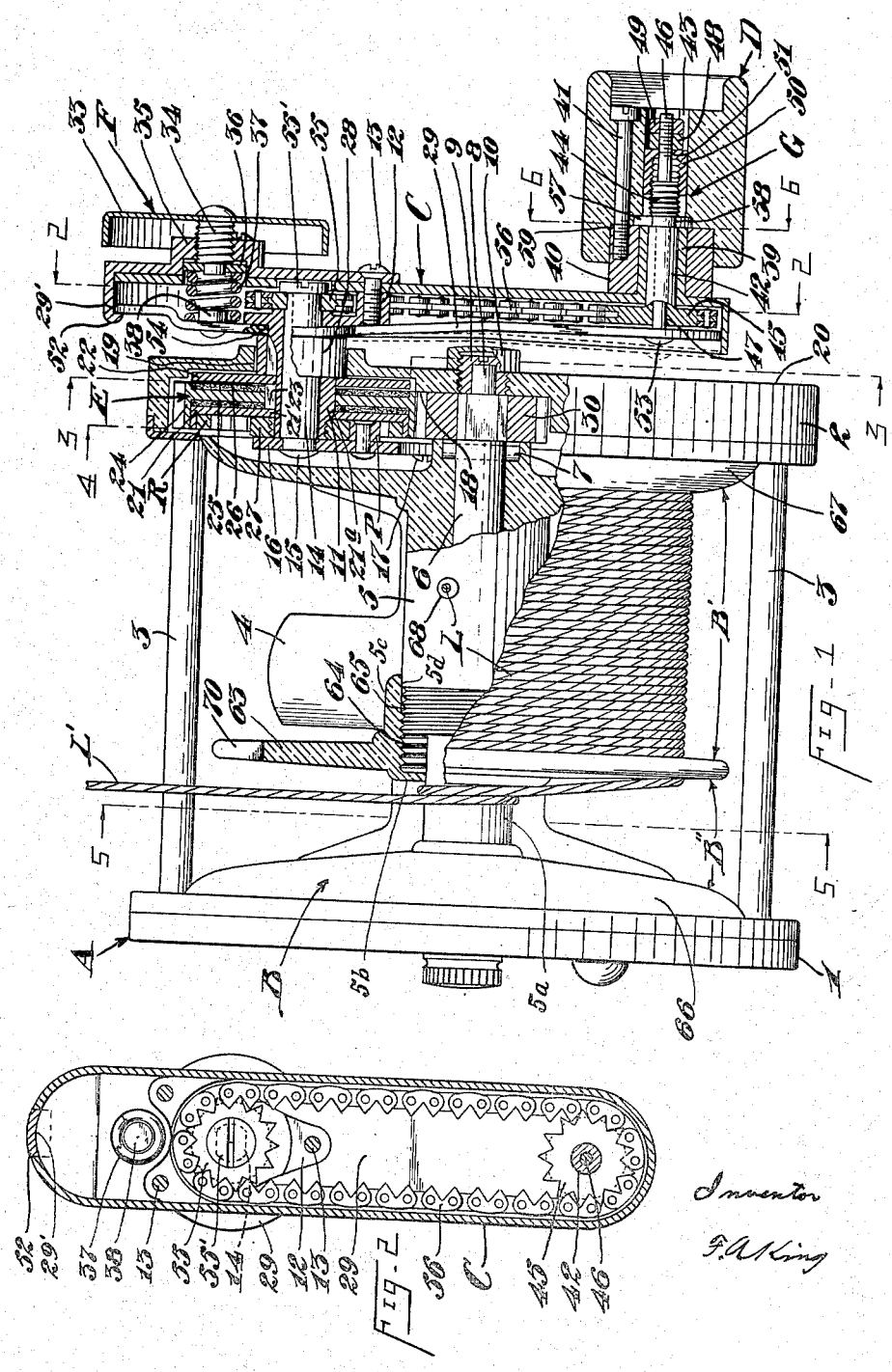
Inventor
F. A. King

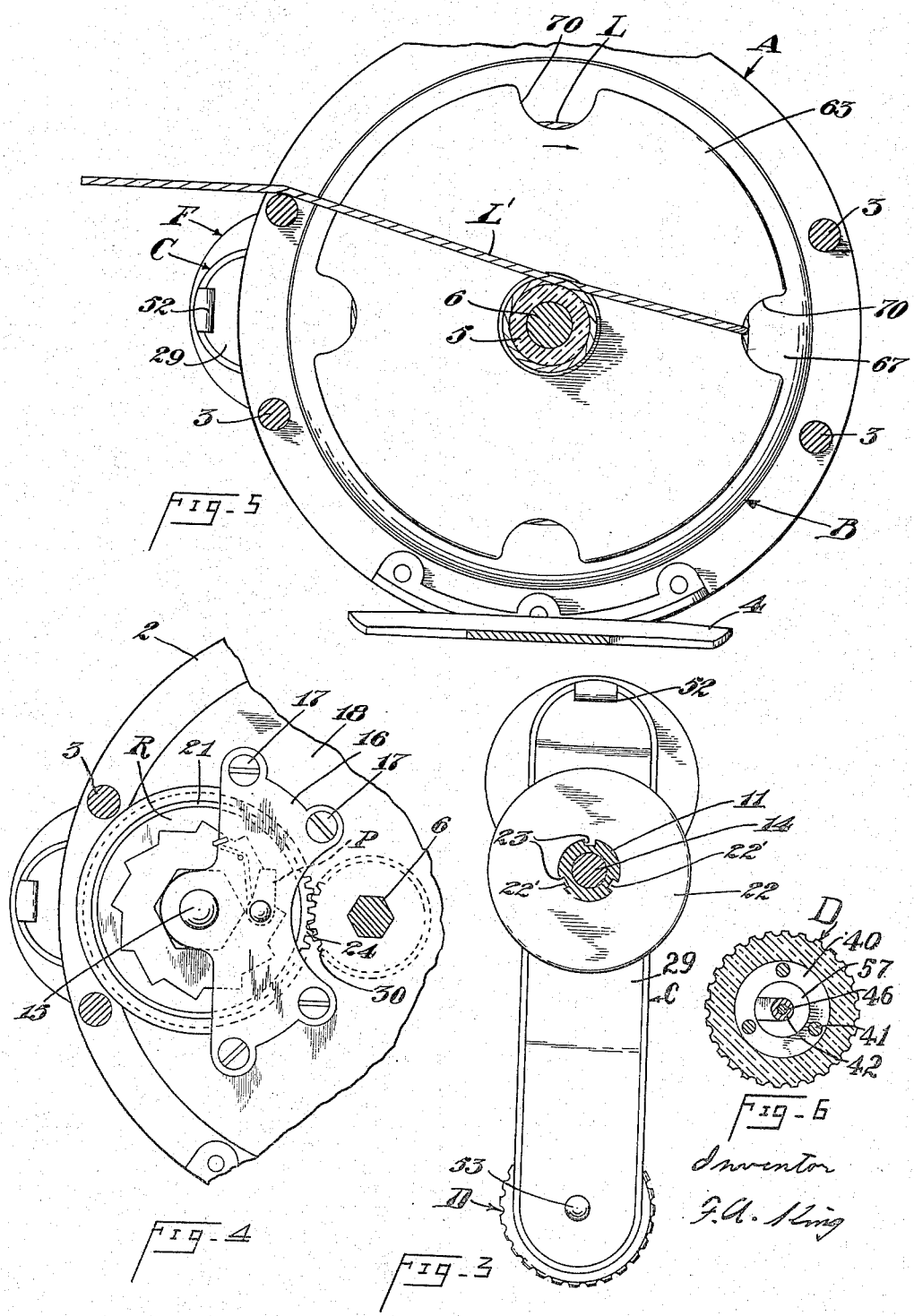

Patented Nov. 28, 1944

2,363,533

UNITED STATES PATENT OFFICE 2,363,533

REELING MECHANISM

Frank A. King, Los Angeles, Calif.

Application September 20, 1941, Serial No. 411,676

4 Claims. (Cl. 242—118)

This invention relates to reeling mechanism for crank operated reels of any type and more particularly fishing reels as shown in my United States Letters Patent Nos. 2,219,322 and 2,162,726 issued October 29, 1940 and June 20, 1939 respectively, and contemplates further improvements in the crank mechanism of the type described therein.

A most important object of this invention is to provide a new form of auxiliary or divided spool wherein a partition dividing the spool into separate parts is logitudinally adjustable on the spool hub to vary its width with respect to its diameter so that an auxiliary spool capacity will accommodate only that portion of line or length equal thereto which is to be used for casting.

It is another object of this invention to provide a fishing reel spool which is capable of dual ratio functioning, as the line may be wound on either section thus affording a selective low and high winding-in ratio.

With the foregoing objects in view, together with such other objects and advantages as may subsequently appear, the invention is carried into effect as illustrated by way of example in the accompanying drawings, in which:

Fig. 1 is a fragmentary top plan view of reeling mechanism embodying my invention as applied to a fishing reel, parts being broken away and parts shown in section for clarity of illustartion;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 1;

Fig. 5 is a sectional view taken on the line 5—5 of Fig. 1;

Fig. 6 is a sectional view taken on the line 6—6 of Fig. 1.

Referring to Figs. 1 to 6 inclusive of the drawing more specifically, wherein my invention is embodied in a fishing reel, it is seen that such a reel includes a frame A made up of recessed end plates 1 and 2 held in opposed spaced relation by the usual tie rods or pillars 3 and the reel seat 4 which affords attachment of the reel to a pole.

Supported on the frame A is a spool B having a tubular hub 5 receiving a shaft 6 keyed thereto as at 7 and journalled in the end plates 1 and 2. As shown in Fig. 1 a reduced end 8 of the shaft 6 is journalled in a bearing 9 screwed into the plate 2. A cap 10 is screwed on this bearing so as to provide for taking up end play and the holding of the bearing in place.

A crank C is mounted on the end plate 2 for operating the spool B and at the end thereof opposite the crank handle D is provided a hollow stud shaft 11 having an integral bracket-like end 12 secured to the crank by means of screws 13. A pin 14 is riveted as at 15 or otherwise fixed to a bridge plate 16 secured by means of screws 17 to the inner wall 18 of the recessed end plate 21. This pin extends through an opening 19 in the outer outer wall 20 of said end plate whereby the hollow shaft 11 may be rotatably supported thereon as shown in Fig. 1.

In accordance with my invention and as best shown in Fig. 1 a combined friction clutch and drag unit E is mounted in the hollow end plate 2 for drivingly connecting and disconnecting the crank C with the spool B. This unit includes a drum-like clutch plate 21 and a similar clutch plate 22 having integral keys 21' and 22' engaged in keyways 23 in the shaft 11. The clutch plate 22 is free to move axially on the shaft 11. A drive gear 24 is loosely mounted on the shaft 11 between the clutch plates and fiber clutch disks 25 and 26 which latter are press fitted in recesses in the drive gear and lie between the plates 21 and 22 on opposite sides of the gear 24.

A lock nut 27 is threaded on the inner end of the shaft 11 and abuts the outer face of the clutch plate 21 which in turn abuts an annular shoulder 21a on the shaft 11 whereas a clutch actuating sleeve 28 axially movably mounted on the shaft 11 within the opening 19 abuts the outer face of the clutch plate 22. When this sleeve is pressed inwardly as by means of a lever 29 fulcrumed at one end 29' on the crank C, the clutch plates, clutch disks and gear 24 are forced into close frictional engagement with one another and the gear 24 is drivingly connected with the clutch plates which are driven by the hollow shaft 11 on the crank C. As gear 24 meshes with a pinion 30 fixed on the spool shaft 6 it is apparent that the spool will be rotated in an anti-clockwise or "winding in" direction, as here shown at a 2 to 1 ratio, when the clutch drag unit is operative as a clutch and the crank is rotated in a clockwise direction.

A pre-setting means F is mounted on the outer side of crank C in a most convenient location and comprises a knob 33 fixed to one end of screw shaft 34 turned in a screw threaded boss 35 on the crank C, and a spring keeper 36 on said screw shaft for one end of a spring 37, the other end of the spring being held on the lever 29 by means of a keeper 38. The tension of the spring 37 is regulated by turning the knob 33 and by this means a setting of the "drag" may be had as desired to drivingly connect and disconnect the gear inasmuch as the spring 37 when under tension will yieldingly force the clutch members into frictional engagement for action as a clutch and "drag" creating means.

Crank handle actuated means G, as shown in Figs. 1 and 2, consists of a hollow stud shaft 39 fixed to the crank C and rotatably supporting thereon a sleeve 40 to which the handle D is secured in axial alignment therewith by means of screw bolts 41. A tubular shaft 42 extends through the hollow stud shaft and into a coaxial bore 43 in the handle D and is externally screw threaded as at 44 on its outer end and carries a sprocket 45 formed integral or otherwise fixed thereto and lying within the crank C. In this connection it is to be noted that the crank C is channelled to house the parts carried thereby.

A slidable rod 46 is extended through an opening 47 in the sprocket 45 and into the bore 43 of the handle D and has a stop nut 48 and a lock nut 49 turned on its outer end. A cap nut 50 is turned on the threaded outer end 44 of the shaft 42 and has an opening 51 therein through which the rod 46 extends, said cap nut abutting the stop nut 48. The bore 43 in the handle D is of hexagonal cross section and cap nut 50 is of hexagonal form and fits snugly in said bore so as to turn with the handle and thereby be screwed in or out on the end 44 of the shaft 42. The stop and lock nuts 48 and 49 are of such smaller diameter than the bore 43 as to avoid contact with the wall of said bore.

The lever 29 is fulcrumed at the end 29' by means of a keeper lug 52 on one end of the crank, and the other end of the lever is fixed as at 53 to the inner end of the slide rod 46 and has an apertured portion 54 embracing the shaft 11 and abutting the sleeve 28.

Counterclockwise rotation of the handle D will move the rod 46 outwardly to release the clutch drag unit. Clockwise rotation releases the rod 46 so that the spring 37 may force the lever inwardly and set the drag. These operations are made possible by a non-rotating sprocket 55 fixed on the stationary pin 14 by means of screw 55' and a stabilizing sprocket chain 56 mounted on sprockets 45 and 55 to prevent rotation of the sprocket 45 about its axis. As sprocket 45 is thus held, it is seen that the nut 50 will move axially of shaft 42 when the handle D is turned, and therefore control the rod 46 and lever 29 as aforesaid.

It should be noted that a U-shaped washer 57 is fitted on the shaft 42 in a groove 58 thereon before the handle D is secured to the sleeve 40, said washer engaging the outer ends of said sleeve and shaft 42 respectively to hold the unit assembled. The handle D is counterbored as at 59 to accommodate the sleeve 40 and washer 57.

Assuming that it is desired to set the clutch drag unit E to effect a winding of the line L on the spool B, the handle D is given a clockwise turn to free the lever 29 so that it may be moved inwardly and the knob 33 is turned clockwise to increase the tension of the spring 37 so that the lever 29 will be rocked and push the sleeve 28 inwardly against the clutch plate 22, thereby frictionally setting the clutch drag unit and drivingly connecting the crank C and spool B.

During the winding-in of the line should it be desired to release the clutch drag unit E, the operator turns the handle D counterclockwise on its axis and thus screws the hexagon nut 50 outwardly inasmuch as the shaft 42 is held against turning on its axis by the chain 56 and sprockets 45 and 55. As the nut 50 moves outwardly against the stop nut 48 on the rod 46 the latter is pulled outwardly and rocks the lever 29 against the action of the spring 37 so as to relieve the tension of said spring from the sleeve 28 and thereby release the drag.

To set the drag with the handle D the operator turns said handle clockwise and the nut 50 is screwed inwardly away from the nut 48 on the rod 46 thereby releasing said rod and the lever 29 so that the spring 37 will again exert its tension against and rock the lever to force the clutch members into clutching engagement. The drag effect may be regulated at will through this manipulation of the handle D depending on the degree of turning thereof, it being possible to allow the full tension of spring 37 or less than the full tension to be applied to the lever 29. Thus a nicety of control of the drag is made possible without requiring the hand of the operator to be removed from the crank handle.

It should be noted that a ratchet ring R is press-fitted in the drum-like clutch plate 21 for cooperation with a pawl P on the bridge plate 16 to prevent counterclockwise rotation of the crank C.

An important provision of this invention is that of a dual ratio non-back lashing spool. As here shown the spool B is formed with a wide winding section B' and a narrow winding section B'' by means of a circular disk partition 63 having a screw threaded central opening 64 receiving a screw threaded part 65 of the spool hub 5, said partition being of substantially the same diameter as the end members 66 and 67 of the spool. The hub is provided with a reduced end portion 5a serving as a hub for the narrower winding space B'' of the spool. This reduction of the hub provides a greater diameter of the winding space B'' for a proper casting length of line, in compensation for the narrowness of the space between partition 63 and the end 66. The reduced hub 5a is slidably engaged by the inner edge of an annular guard flange 5b on one end of a hub 5c for the partition 63, said flange in all positions of the partition preventing the line of the innermost windings from being pinched, caught or damaged. The hub 5c for the most part extends to the right of the partition and has the screw threaded part of the opening 64 therein extended from the flange approximately half-way through the hub, leaving a smooth bore 5d. Due to this arrangement and the extent of the screw threads, the hub 5c covers the threaded part 65 of the hub 5 in all positions of the partition thereby protecting the line from such part.

The screw threaded connection of the partition and hub provides for axial adjustment of the partition to vary the line holding capacity of the two winding sections as desired. The line L may be secured to the spool (larger section B') as by means of the opening 68 leading through the hub 5, and in the main is wound in said wider section thus providing a winding of greater capacity than in the narrow section. A casting length L' of the line L is determined to suit the particular user and conditions at hand and such a length is wound onto the narrow section B'', being extended through one of a series of peripherial notches 70 in the partition 63 as shown in Fig. 5.

The casting portion of the line is wound on the narrow section of the spool to a diameter exceeding that of the main winding, thus when the initial cast is made the speed of spool rotation is slow and is permitted to remain the same, without necessitating thumbing of the reel, throughout the time of the cast. Obviously as the baited line is carried out its natural tendency is to progressively retard in its velocity and so also does the line, due to the progressive reduction in lengths of line unwound from the increasingly reduced diameter of the winding.

The casting length L' of the line when wound in the narrow section B'' provides a winding of relatively narrow width and will unreel much less line per revolution with the result that when casting this length the ratio of line travel to the speed of rotation of the reel is such that back lashing will be positively prevented.

This divided spool affords a dual ratio winding-in of the line as the line L' is normally carried in the wider section B' and the narow section reserved for emergency use when the line is slipped over from the main winding in the wider section B' to the narrow section B'' for a much slower, reeling in thereof than possible when winding the line on the wider (diameter) section of the spool.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. A divided anti-backlash spool for a fishing reel comprising a hub, end flanges on said hub, a partition mounted on said hub at a point between one of said end flanges and the center of the spool to define a winding space which is narrower than the winding space between said partition and the other end flange, said hub having an end portion of uniform reduced diameter extending between the partition and said one end flange and serving as a hub for said narrower winding space, a hub on said partition adjustably supporting the partition on the unreduced portion of the spool hub.

2. In a divided fishing reel spool, a spool hub having a portion of reduced diameter extending part way of the length of the hub from one end thereof, flanges on the ends of the hub, a substantially circular partition mounted on the hub and defining between the inner face of the partition and one of the end flanges a large winding space and between the outer face of the partition and the other end flange a smaller winding space for a length of line to be cast from the reel, an elongated hub extending axially from the inner face of the partition and encompassing and being axially adjustable in either direction on that part of the spool hub lying between the partition and the flange farthest removed therefrom whereby the reduced portion of the spool hub is exposed for substantially its full length to receive windings, and an annular flange on the partition hub lying close to and substantially parallel with the outer face of the partition and in circumferential engagement with the reduced portion of the spool whereby the latter for substantially the full distance between the adjacent end flange and the partition is exposed for reception of windings of line.

3. In a divided fishing reel spool, a spool hub having a portion of reduced diameter extending part way of the length of the hub from one end thereof and provided at one end of the unreduced portion with screw threads, flanges constituting the ends of the spool, a substantially circular partition mounted on the spool hub to define a large winding space between the inner face of the partition and one of said flanges, and a smaller winding space between the outer face of the partition and the other flange, an internally screw threaded hub on the partition adjustably mounted on the screw threaded portion of the spool hub and extending for the most part inwardly from the partition so that the inner end thereof lies between the partition and the end flange farthest removed therefrom, said partition being circumferentially contacted with the reduced portion of the spool hub at a point close to the partition whereby substantially the full length of said reduced portion of the spool hub lying between the partition and the adjacent end flange is exposed for reception of windings of line in the smaller winding space.

4. In a divided fishing reel spool, a spool hub having a portion of reduced diameter extending part way of the length of the hub from one end thereof and provided at one end of the unreduced portion thereof with screw threads, flanges constituting the ends of the spool, a substantially circular partition mounted on the hub to define a large winding space between the inner face of the partition and one of said flanges and a smaller winding space between the outer face of the partition and the other flange, an internally screw theaded hub carried by the partition and adjustably mounted on the screw threaded portion of the spool hub and extending for the most part inwardly from the partition so that the inner end thereof lies between the partition and the end flange farthest removed therefrom, said partition having an annular portion circumferentially contacted with the reduced portion of the spool hub at a point close to the partition proper whereby substantially the full length of said reduced portion of the spool hub lying between the partition proper and the adjacent end flange is exposed for reception of windings of line in the smaller winding space, said partition hub covering the screw threaded portion of the spool hub in all adjusted positions of the partition.

FRANK A. KING.